(12) United States Patent
Spracklen (10) Patent No.: US 8,553,876 B1
(45) Date of Patent: Oct. 8, 2013

(54) HIGH PERFORMANCE CRYPTOGRAPHY ON CHIP MULTITHREADING PROCESSORS

(75) Inventor: Lawrence Spracklen, Boulder Creek, CA (US)

(73) Assignee: Oracle America, Inc., Redwood City, CA (US)

( * ) Notice: Subject to any disclaimer, the term of this patent is extended or adjusted under 35 U.S.C. 154(b) by 1258 days.

(21) Appl. No.: 11/877,167

(22) Filed: Oct. 23, 2007

(51) Int. Cl.
G06F 21/00 (2013.01)

(52) U.S. Cl.
USPC .......................................... 380/28

(58) Field of Classification Search
USPC .......................................... 380/28
See application file for complete search history.

(56) References Cited

U.S. PATENT DOCUMENTS

| | | | | |
|---|---|---|---|---|
| 4,319,079 A * | 3/1982 | Best | ............................. | 713/190 |
| 6,182,216 B1 * | 1/2001 | Luyster | ......................... | 713/168 |
| 6,199,162 B1 * | 3/2001 | Luyster | ......................... | 713/168 |
| 7,831,777 B2 * | 11/2010 | de Mevergnies et al. | ..... | 711/145 |
| 2002/0186841 A1 * | 12/2002 | Averbuj et al. | ................ | 380/44 |
| 2003/0110197 A1 * | 6/2003 | Hansen et al. | ............... | 708/620 |
| 2004/0156499 A1 * | 8/2004 | Heo et al. | ........................ | 380/37 |
| 2006/0155915 A1 * | 7/2006 | Pereira | ........................ | 711/100 |
| 2006/0184803 A1 * | 8/2006 | Ulrich et al. | .................. | 713/189 |
| 2007/0022412 A1 * | 1/2007 | Tirumalai et al. | ............. | 717/140 |
| 2007/0022422 A1 * | 1/2007 | Tirumalai et al. | ............. | 718/100 |
| 2007/0277001 A1 * | 11/2007 | Mevergnies et al. | .......... | 711/145 |
| 2008/0059712 A1 * | 3/2008 | Fedorova | ...................... | 711/130 |
| 2008/0109625 A1 * | 5/2008 | Erlingsson et al. | ........... | 711/163 |
| 2008/0288789 A1 * | 11/2008 | Harris et al. | .................. | 713/193 |

* cited by examiner

Primary Examiner — Bradley Holder
(74) Attorney, Agent, or Firm — Brooks Kushman P.C.

(57) ABSTRACT

Improved performance of a chip multithreading (CMT) processor during processing of a cipher is disclosed. The chip multithreading processor may be located on a chip multithreading processor chip that includes a processor cache. The selection of a cipher is received. The cipher is processed by executing a plurality of cryptographic operations on the chip multithreading processor. Lookup tables used during the execution of the plurality of cryptographic operations are determined. The size of at least one of the lookup tables may be increased, such that the at least one lookup table is able to be stored in a processor cache located on the chip multithreading processor chip. Further adjustments may be made to the size of one or more lookup tables depending on the cipher selected, other operations executing on the chip multithreading processor, or both.

12 Claims, 6 Drawing Sheets

HIGH PERFORMANCE CRYPTOGRAPHY ON CHIP MULTITHREADING PROCESSORS

BACKGROUND

Most cryptographic computations are very computationally intensive. As such, they are poorly suited to aggressive chip multithreading (CMT) processors, where a core may be only single-issue. Each core may support multiple strands (via VT (vertical threading) or SMT (symmetric multithreading)). Aggressive chip multithreading processors are better suited to multithreaded workloads, where each thread exhibits a large CPI (cycles per instruction), spending most of its time stalled waiting for memory operations to complete. Aggressive chip multithreading processors may not work as optimally when performing computationally intensive cryptographic operations, such as encryption and decryption processes. However, the security benefits provided by such processes are an integral part of many commercial applications. Aggressive chip multithreading processors are thus likely to frequently encounter intensive cryptographic operations, despite their typically performing poorly when executing such operations.

SUMMARY

Conventional technologies do not yield good software cryptographic performance on aggressive chip multithreading processors. Embodiments disclosed herein provide for improved performance of cryptographic operations executed on aggressive chip multithreading processors.

More particularly, in an embodiment of the invention, there is provided a method of processing a cipher using a chip multithreading (CMT) processor. The chip multithreading processor may be located on a chip multithreading processor chip that includes a processor cache. The method includes receiving a selection of a cipher, wherein the cipher is processed by executing a plurality of cryptographic operations on a chip multithreading processor. Lookup tables used during the execution of the plurality of cryptographic operations are determined. The size of at least one of the lookup tables is increased, such that at least one of the lookup tables is able to be stored in a processor cache located on a chip multithreading processor chip.

In a related embodiment, the increasing may include increasing the size of the lookup tables such that no lookup table is so large that it is unable to be stored in a processor cache located on a chip multithreading processor chip. In a further related embodiment, receiving may include receiving a selection of a Kasumi cipher, wherein the Kasumi cipher is performed by executing a plurality of cryptographic operations, and increasing may include increasing the size of two lookup tables such that each of the two tables is able to be stored in a processor cache located on the chip multithreading processor chip.

In another related embodiment, receiving may include receiving a selection of a cipher, wherein the cipher is processed by executing a plurality of arithmetic logic unit operations on a chip multithreading processor, and determining may include determining lookup tables used during the execution of the plurality of arithmetic logic unit operations. The method may include processing the selected cipher on the chip multithreading processor and counting the number of arithmetic logic unit operations executed during processing of the selected cipher on the chip multithreading processor to determine an initial operation count.

In a further related embodiment, the method may include processing the selected cipher on the chip multithreading processor after increasing the size of at least one of the lookup tables. The method may also include counting the number of arithmetic logic unit operations executed during processing of the selected cipher on the chip multithreading processor with the increased lookup table to determine an adjusted operation count, and comparing the initial operation count with the adjusted operation count to determine an operation count result.

In still a further related embodiment, the method may include adjusting the size of the increased lookup table based on the operation count result, wherein the lookup table is able to be stored in a processor cache located on a chip multithreading processor chip after being adjusted. In yet another further related embodiment, the method may include monitoring other operations being executed on the chip multithreading processor to produce an operation execution result, and using the operation execution result to further adjust the size of the increased lookup table, wherein the lookup table is able to be stored in a processor cache located on a chip multithreading processor chip after being adjusted.

In yet another related embodiment, determining may include determining a plurality of initial lookup tables used during the execution of the plurality of cryptographic operations, and increasing may include combining a plurality of initial lookup tables into a single lookup table, the single lookup table able to be stored in a processor cache located on a chip multithreading processor chip. In still yet another related embodiment, determining may include determining a plurality of initial lookup tables used during the execution of the plurality of cryptographic operations; and increasing may include pre-computing additional operations to produce results; and combining the results into an initial lookup table, that lookup table able to be stored in a processor cache located on a chip multithreading processor chip.

In another embodiment there is provided a computer program product stored on computer readable medium to process a cipher using a chip multithreading (CMT) processor. The computer program product includes computer program code for computer program code for receiving a selection of a cipher, wherein the cipher is processed by executing a plurality of cryptographic operations on a chip multithreading processor. The computer program product also includes computer program code for determining lookup tables used during the execution of the plurality of cryptographic operations, and computer program code for increasing the size of at least one of the lookup tables, such that at least one of the lookup tables is able to be stored in a processor cache located on the chip multithreading processor chip.

In another embodiment, there is provided a computer system that includes a memory, a processor chip including a chip multithreading processor and a processor cache, a communications interface, and an interconnection mechanism coupling the memory, the processor chip, and the communications interface, allowing communication there between. The memory is encoded with a cryptographic operations application, that when executed in the chip multithreading processor of the processor chip, provides a cryptographic operations process that processes a cipher. The cryptographic operations process causes the computer system to perform the operations of receiving a selection of a cipher, wherein the cipher is processed by executing a plurality of cryptographic operations on a chip multithreading processor; determining lookup tables used during the execution of the plurality of cryptographic operations; and increasing the size of at least one of the lookup tables, such that at least one of the lookup tables is able to be stored in a processor cache located on the chip multithreading processor chip.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein may be employed in computerized devices and software systems for such devices such as those manufactured by Sun Microsystems, Inc. of Santa Clara, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein include methods, systems, and apparatus that improve the performance of a chip multithreading processor when the chip multithreading processor is performing cryptographic operations. Cryptographic operations include ciphers, which are algorithms used to protect data by encrypting the data and then decrypting it when appropriate. That is, the cipher is the process by which encryption and decryption of data occurs. The selection of a cipher, or other type of algorithm that requires cryptographic operations, is received. The cipher is processed by executing a plurality of cryptographic operations on the chip multithreading processor. One or more lookup tables may be used during the execution of the operations. These lookup tables are determined, and at least one of them is increased in size. At least one of the lookup tables is still able to be stored in a processor cache located on the chip multithreading processor chip, even if one or more of the lookup tables has been increased in size. Further adjustments, either increases, decreases, or both, may be made to the size of one or more lookup tables depending on the cipher selected, other operations executing on the chip multithreading processor, already-achieved improvements in performance, and so on, to further improve performance of the chip multithreading processor.

Note that larger, that is increased in terms of size, lookup tables may be achieved in a variety of ways, and may provide a variety of benefits. For example, it is also possible to merge multiple smaller tables into one or two tables, or to pre-compute additional logical operations and combine the results into the initial lookup tables. Typically, for traditional processors, lookup tables are sized such that they fit in the relatively small Level-1 caches on the processor, so a number of small lookup tables tend to result. A chip multithreading processor is better suited to a smaller number of larger lookup tables that reside in the level-2 cache. That is, if two 1024-element tables are combined, the result is not a 2048-element table, but rather a 1048576-element table (1024*1024). For a traditional processor, it is much better to have two accesses to small level-1 resident tables and the additional arithmetic logic unit (ALU) operations that go along with both loading the data and combining the results, rather than a single access operation to a large lookup-table in the level-2 cache. However, for chip multithreading processors, given they are more tolerant of memory latency, the reduced number of tables is often the best approach.

Additionally, there are a variety of ways to measure the performance benefit of having a smaller number of larger lookup tables. Creating larger tables in any of the ways mentioned above, or in any other way described herein, will reduce the number ALU and load instructions required. Thus, there is a trade-off of reduced computing for increased memory latency. Whether the tradeoff is beneficial is complex, and may depend on a variety of factors, including, among things, a reduction in instructions due to the smaller number of larger lookup tables, the load on the processor core(s), the Level-2 cache latency, and so on. Typically, depending on the particular situation being optimized for, different weights will be assigned to the to various factors to arrive at the optimal configuration.

As an example, improved performance is shown though processing a Kasumi cipher according to embodiments of the invention. In Kasumi, a block is 8-bytes, the key is 128-bits (although it is expanded to a 1024-bit key schedule before use), and processing consists of 8 rounds per block. While a variety of operations are performed per block, the most costly operation is termed FI and may include the following (in C notation):

nine=(u16)(in>>7);
seven=(u16)(in&0x7F);
nine=(u16)(S9[nine]^seven);
seven=(u16)(S7[seven]^(nine & 0x7F));
seven^=(subkey>>9);
nine^=(subkey&0x1FF);
nine=(u16)(S9[nine]^seven);
seven=(u16)(S7[seven]^(nine & 0x7F));
in=(u16)((seven<<9)+nine);
return(in);

where in and subkey are two-byte variables, S9 is a 512-element lookup table and S7 is a 128-element lookup table. This operation is performed three times per round, for a total of 24 times per block. Each FI operation requires 22 instructions (for SPARC), for a total of 576 FI-derived instructions per block. Given the abundance of logical and shift operations, it is apparent that superscalar processors will perform this function very well, with an Instructions Per Cycle (IPC) of 2.5 or more. In contrast, some processors implementing a single-strand may have IPC around 0.65 (not one, due to the stall-on-issue nature of load operations). Further, due to the compute intensive nature of the code, some processors implementing a single strand use around two thirds of the processor core's issue resources. As a result, performance does not scale as additional Kasumi threads run on a core.

To overcome this problem, the process is executed on a processor where the instruction count is reduced, even though this reduction is at the expense of increased memory stalls. A reduction in instruction count may be achieved by replacing large parts of the FI function using a large lookup table. In the original Kasumi code, the 16-bit elements are divided into two smaller elements, one 7-bits and one 9-bits. These smaller elements are processed independently and the results combined. While this ensures that the lookup tables are small, significant logical and arithmetic operations are required to split the 16-bit elements and later recombine the smaller 7-bit and 9-bit elements back into the 16-bit elements. Significant computational saving may be achieved by processing an entire 16-bit element at once, using large lookup tables, as shown below:

t0=LT0[in];
t0=t0^subkey;
in=LT1[t0];

The new lookup tables (LT0 and LT1) are now much larger, each being composed of 65536 2-byte elements. Note that the lookup tables are constant, may be precomputed, and are independent of the keys. However, using this approach, the FI function now only requires five instructions, a four times reduction from previous processor implementations. Further note that in both the optimized and the original code, the lookup table accesses are dependent and cannot be performed in parallel or prefetched in advance.

The lookup tables that once fitted in the L1 cache are now much larger and will now largely reside in the L2 cache. As a result, it would appear that the performance of the code will remain largely unchanged, having traded decreased instruction count for increased memory stalls. This optimization technique is beneficial for at least two reasons. First, MT (multithreading) performance is improved. For the initial implementation, due to the large computational requirements of the algorithm, as additional strands are leveraged, aggregate core performance improves very little. Given that a single strand is capable of consuming almost all of a processor core's resources, as additional VT/SMT strands are leveraged, these strands rapidly start to deprive the other strands of resources, and the aggregate core performance is improved very little. In contrast, in the optimized version, the strands spend most of their time stalled waiting for accesses to the lookup tables to complete and consume a much smaller fraction of a processor core's resources. As a result, as the number of strands is increased, performance scales almost linearly.

A second benefit is improved ST (single threading) performance. While this optimization technique may only appear to benefit MT performance, if the latency associated with executing the operations collapsed into the lookup table is larger than the L2 cache hit latency, single-thread performance will not be adversely impacted by the optimization, and may even be improved. The 'apparent' latency of the memory operation is also dependent upon whether other strands are consuming the VT/SMT core's resources. Assuming that the processor core is heavily utilized, if there are X strands per core, then the apparent latency of all memory operations is reduced by a factor of X. Accordingly, if the L2 cache latency is 20-cycles, then, if there are four strands per core, the apparent latency of the operation is merely 5-cycles. In the 20-cycle period, the strand would only have the opportunity to issue around five instructions. Conversely, if only a single-strand is active, then the entire 20-cycles latency is exposed. In the first situation, if the larger lookup table removes five instructions or more, then the ST performance delivered by the disclosed implementation will be superior. However, if the core is underutilized, then the lookup table will need to eliminate up to 20 instructions to achieve performance parity. As a result, the exact trade-offs between the two approaches is dependent on the number of instructions eliminated by the larger lookup tables and the load on the core. For processing a Kasumi cipher, ST performance is also improved by the disclosed implementation.

Leveraging the disclosed implementation further improves MT Kasumi performance. However, it should be noted that this technique is not Kasumi-specific. Rather, it may be used to accelerate many bulk ciphers on aggressive chip multithreading processors.

Figure 1:
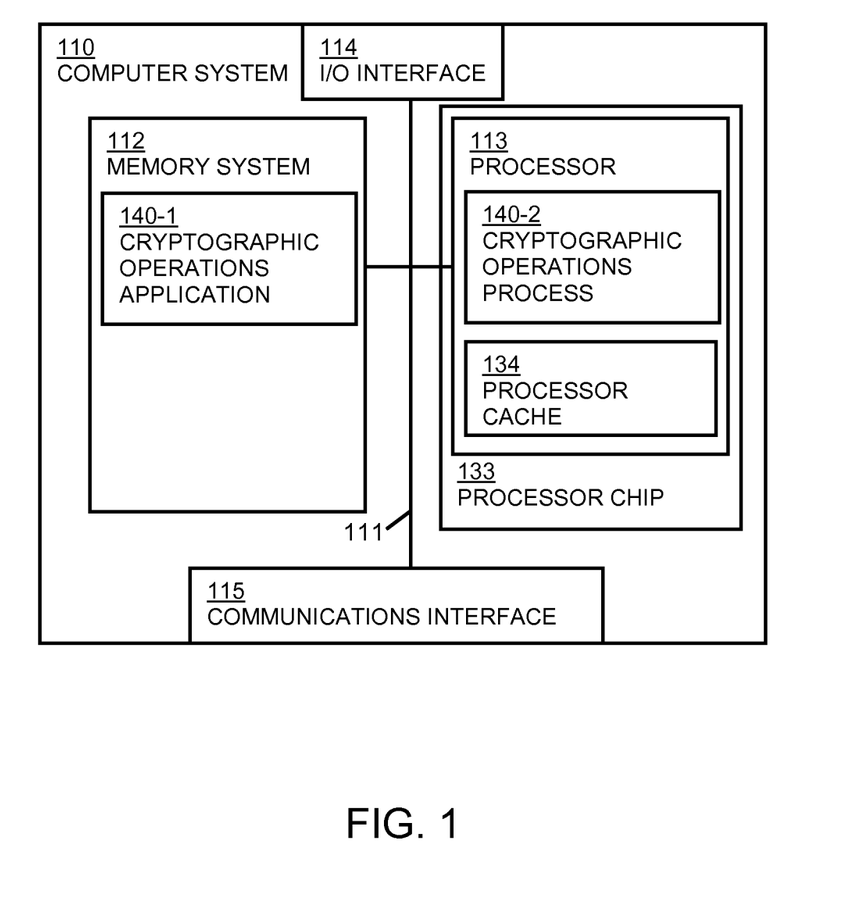
FIG. 1 shows a high-level block diagram of a computer system according to one embodiment disclosed herein.

FIG. 1 is a block diagram illustrating example architecture of a computer system 110 that executes, runs, interprets, operates or otherwise performs a cryptographic operations application 140-1 and process 140-2. The computer system 110 may be any type of computerized device such as but not limited to a personal computer, workstation, portable computing device, console, laptop, network terminal or the like. As shown in this example, the computer system 110 includes an interconnection mechanism 111 such as a data bus or other circuitry that couples a memory system 112, a processor 113, and a communications interface 115. The computer system 110 may include an input/output interface 114 through which an input device (not shown in FIG. 1) (e.g., one or more user/developer controlled devices such as a pointing device, keyboard, mouse, etc.) allows a user to provide commands to the computer system 110. The communications interface 115 enables the computer system 110 to communicate with other devices, such as but not limited to other computers. The processor 113 may be a chip multithreading processor that includes a processor cache 134 and is located on a processor chip 133.

The memory system 112 is any type of computer readable medium and in this example is encoded with a cryptographic operations application 140-1. The cryptographic operations application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnection mechanism 111 in order to launch, run, execute, interpret or otherwise perform the logic instructions of the cryptographic operations application 140-1. Execution of the cryptographic operations application 140-1 in this manner produces processing functionality in a cryptographic operations process 140-2. In other words, the cryptographic operations process 140-2 represents one or more portions of runtime instances of the cryptographic operations application 140-1 (or the entire application 140-1) performing or executing within or upon the processor 113 in the computer system 110 at runtime.

A number of flowcharts of the presently disclosed method are illustrated in FIGS. 2-6. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 2:
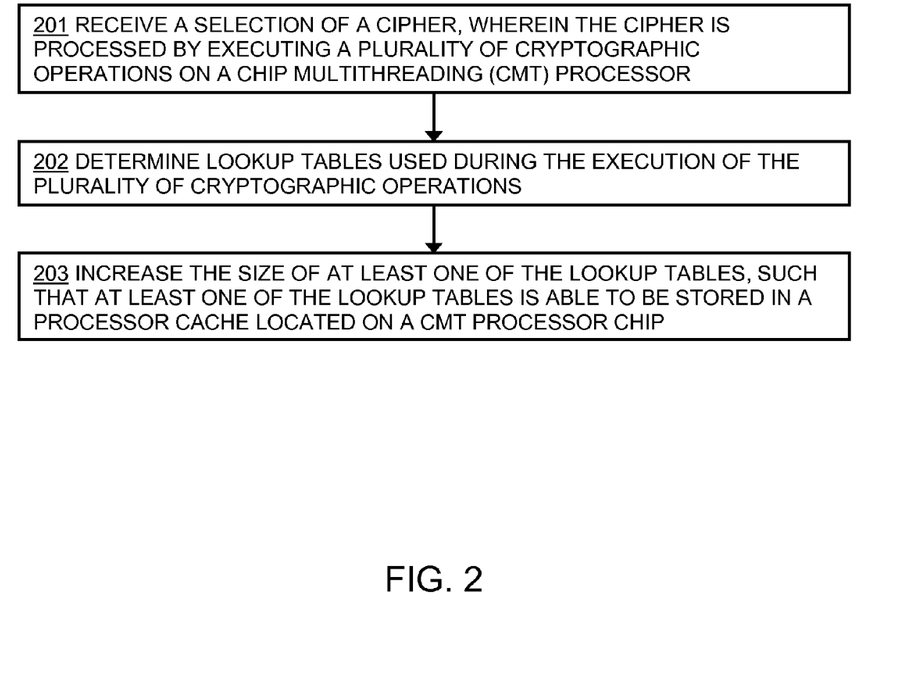
FIG. 2 illustrates a flowchart of a procedure performed by the system of FIG. 1 when executing the cryptographic operations application as the cryptographic operations process to improve performance on a chip multithreading processor.

More specifically, FIGS. 2-6 illustrate flowcharts of procedures performed by the computer system 110 when executing the cryptographic operations application 140-1 as the cryptographic operations process 140-2. In FIG. 2, the cryptographic operations process 140-2 improves performance of a chip multithreading (CMT) processor during processing of a cipher, or any other type of process that requires the use of cryptographic operations. The chip multithreading processor, such as the processor 113 shown in FIG. 1, may be located on a chip multithreading processor chip, such as the processor chip 134, which may include a processor cache, such as the cache 134. The cryptographic operations process 140-2 first receives a selection of a cipher, step 201. The cipher is processed by executing a plurality of cryptographic operations on a chip multithreading processor. The cipher may be, but is not limited to, well-known ciphers such as the Kasumi cipher, particular types of ciphers, such as block ciphers and stream ciphers, and the like. Some methods of processing the cipher may include references to one or more lookup tables. As described herein, the cryptographic operations process 140-2 acts on a cipher, though the cryptographic operations process 140-2 may be modified as needed to improve the performance of any type of process that includes cryptographic operations that rely on lookup tables.

The cryptographic operations process 140-2 may receive the selection of a cipher in any of a variety of ways. For example, a user (not shown in FIG. 1) may use an input device (not shown in FIG. 1) that is connected to the computer system 110 to provide some type of input to the cryptographic operations process 140-2 that corresponds to the selection of a cipher. That input may be in the form of a text string corresponding to a particular cipher. Alternatively, that input may be in the form of a selection of one particular cipher from a list of ciphers presented in some graphical form (i.e., by pull down menu, radio buttons, etc.) on a graphical user interface shown on a display (not shown in FIG. 1). In another embodiment, the cipher itself may be loaded into the memory system 112, through a copy or cut operation from a storage medium (such as a CD-ROM, DVD-ROM, flash drive, or the like), or through a particular installation operation from a similar storage medium. In such a situation, the cryptographic operations process 140-2 receives some type of notification that a cipher is available, and is to be used. This notification may be through a message transmitted directly to the cryptographic operations process 140-2, or through some other type of signal, or any process that results in the cryptographic operations process 140-2 being notified of the selection of a cipher. A separate process from the cryptographic operations process 140-2 may control the selection of a cipher, and/or any notification process, and in one embodiment, the selection of the cipher may be random.

Having received the selection of a cipher, the cryptographic operations process 140-2 then determines lookup tables used during the execution of the plurality of cryptographic operations, step 202. The cryptographic operations process 140-2 may determine these lookup tables in any number of ways. For example, any number of lookup tables may be stored within the memory system 112, corresponding to the particular ciphers that may be solved through use the tables. The cryptographic operations process 140-2 would then access the memory system 112 to find the table or tables needed for the selected cipher. Alternatively, the cryptographic operations process 140-2 may receive the tables from the same source as the cryptographic operations process 140-2 receives the selection of the cipher. In one example, when a cipher is selected by a user providing input via the input device 116, the process that sends the selection of the cipher to the cryptographic operations process 140-2 also sends the necessary table or tables to the cryptographic operations process 140-2. In another example, the cryptographic operations process 140-2 may retrieve the lookup table or tables from a different source, such as a storage device holding the tables that is accessible via a network interface connected to the computer system 110. The cryptographic operations process 140-2 may use these or any other equivalent method to determine the lookup table(s).

Finally, the cryptographic operations process 140-2 increases the size of at least one of the lookup tables, step 203. The change in size of at least one of the lookup tables is limited in at least one way, though other limitations may also be imposed. The cryptographic operations process 140-2 cannot increase the size of a lookup table to the point where that lookup table could not be stored in a processor cache located on a chip multithreading processor chip. In other words, the size of an increased lookup table is limited by the total storage space available on the processor cache, as well as the amount of space taken up by any lookup table that is not increased in size. Any remaining space on the processor cache may be made available to store the increased lookup table. Any and all techniques that are known in the art for increasing the amount of storage space on a processor cache may be applied to provide further space for an increased lookup table of larger size.

Figure 3:
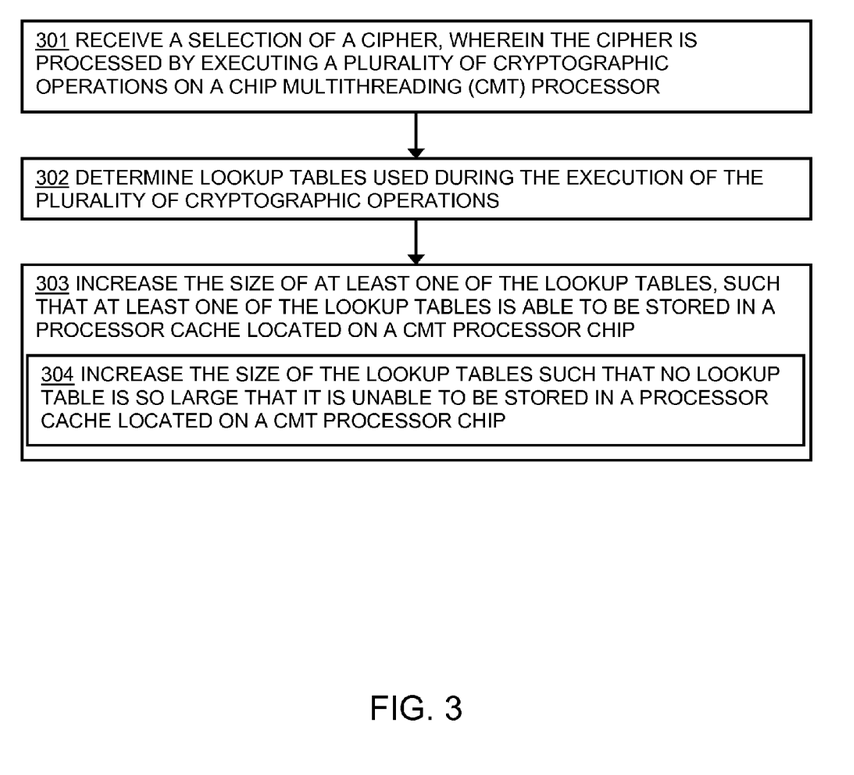
FIG. 3 illustrates a flowchart of a procedure performed by the system of FIG. 1 when increasing the size of more than one lookup table to improve performance during execution of a cipher on a chip multithreading processor.

FIG. 3 illustrates a variation on the method described in FIG. 2. In FIG. 3, the cryptographic operations process 140-2 receives a selection of a cipher, step 301, wherein the cipher is processed by executing a plurality of cryptographic operations on a chip multithreading processor. As described above, any type of process that includes cryptographic operations using lookup tables may be executed on a chip multithreading processor, and the performance of the processor improved through execution of the cryptographic operations application 140-1 as the cryptographic operations process 140-2. The cryptographic operations process 140-2 then determines lookup tables used during the execution of the plurality of cryptographic operations, step 302, using any of the methods described above, or any other similar methods. Finally, the cryptographic operations process 140-2 increases the size of the lookup tables, step 304, such that no lookup table is so large that it is unable to be stored in a processor cache located on a chip multithreading processor chip. Thus, the cryptographic operations process 140-2 is able to adapt to the situation where simply increasing the size of one lookup table does not yield sufficient gains in processor performance for a chip multithreading processor. Here, the cryptographic operations process 140-2 may increase the size of all lookup tables in order to improve performance. Alternatively, the cryptographic operations process 140-2 may increase the size of any number of the lookup tables. One methodology for how the cryptographic operations process 140-2 determines whether a change in the size of one or more lookup tables positively affects the performance of a chip multithreading processor is described below with regards to FIG. 5.

Figure 4:
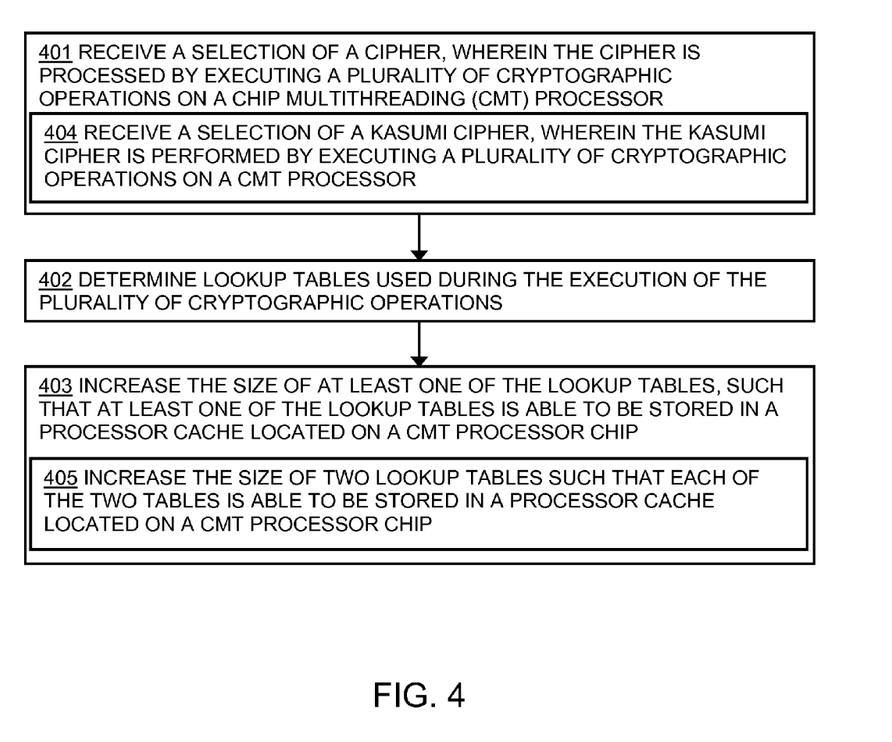
FIG. 4 illustrates a flowchart of a procedure performed by the system of FIG. 1 when improving performance during execution of a Kasumi cipher on a chip multithreading processor.

In FIG. 4, the cryptographic operations application 140-1 is executed as the cryptographic operations process 140-2 on a chip multithreading processor to perform a particular cipher, the Kasumi cipher. As is well known in the art, when performed on a processor, the Kasumi cipher includes cryptographic operations that reference two lookup tables. The cryptographic operations process 140-2 may increase the size of both lookup tables to improve performance of the chip multithreading processor during execution of the Kasumi cipher. The cryptographic operations process 140-2 will first receive a selection of a cipher, step 401, particularly the Kasumi cipher, step 404. The Kasumi cipher is processed by executing a plurality of cryptographic operations on the chip multithreading processor, such as the processor 113 shown in FIG. 1. The cryptographic operations process 140-2 then determines lookup tables used during the execution of the plurality of cryptographic operations, step 402. In this instance, the cryptographic operations process 140-2 will determine the two lookup tables typically used during processing of a Kasumi cipher. Finally, the cryptographic operations process 140-2 increases the size of the two lookup tables, step 404. The cryptographic operations process 140-2 does not allow either of the increased two tables to grow so large that the tables are not able to be stored in the processor cache 134 located on the chip multithreading processor chip 133.

Figure 5:
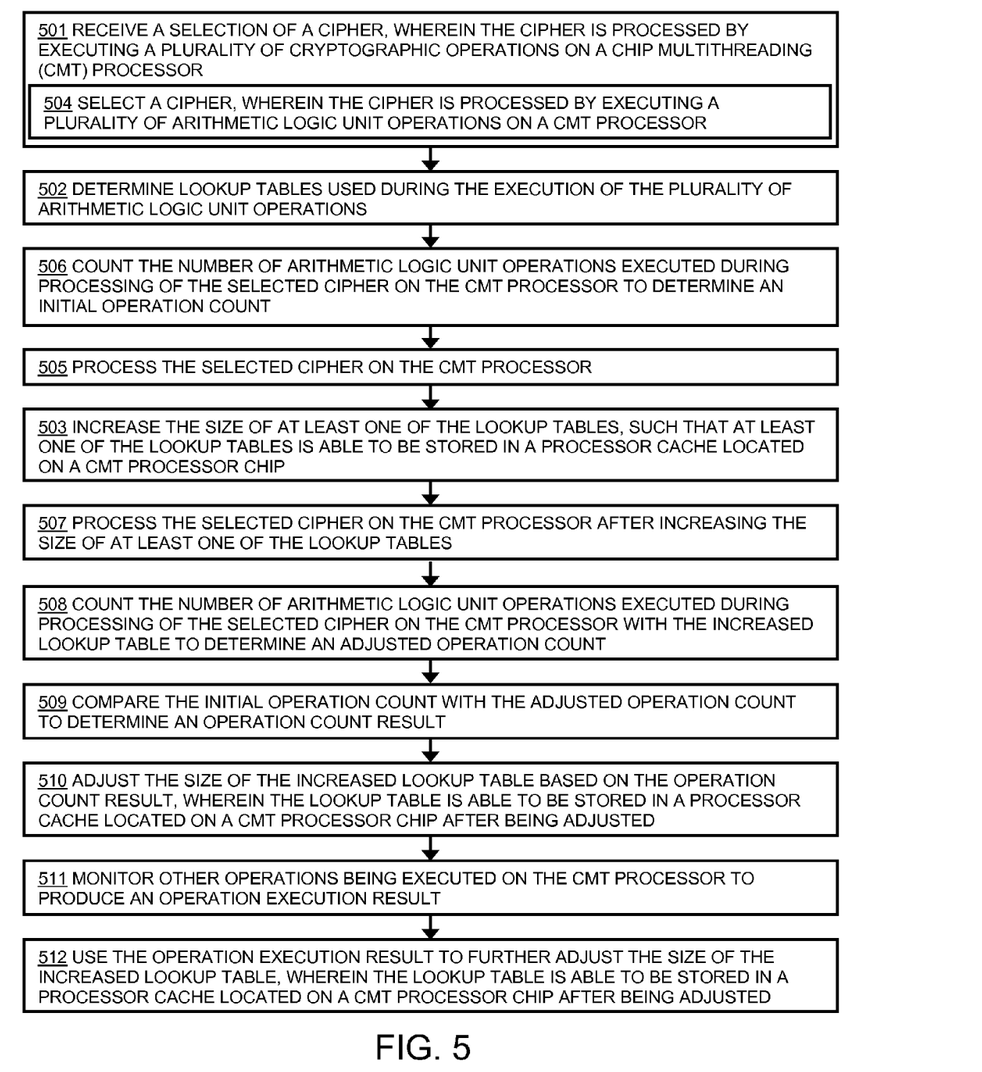
FIG. 5 illustrates a flowchart of a procedure performed by the system of FIG. 1 when further adjusting the size of a lookup table or tables to improve performance during execution of a cipher on a chip multithreading processor.

FIG. 5 illustrates how the cryptographic operations process 140-2 may further refine the size of one or more lookup tables used during the execution of cryptographic operations to improve the performance of a chip multithreading processor when executing cryptographic operations. The cryptographic operations process 140-2 receives a selection of a cipher, step 501, as is described above. Here, the cipher is processed by executing a plurality of arithmetic logic unit operations on a chip multithreading processor, step 504. The cryptographic operations process 140-2 then determines lookup tables used during the execution of the plurality of arithmetic logic unit operations, step 502, by using any process described above, or any other suitable process.

The cryptographic operations process 140-2 next processes the selected cipher on the chip multithreading processor, step 505. The cryptographic operations process 140-2 then counts the number of arithmetic logic unit operations executed during processing of the selected cipher on the chip multithreading processor to determine an initial operation count, step 506. In other words, this is a record of the number of operations needed to execute the cipher without making any changes to any lookup tables. This allows the cryptographic operations process 140-2 to have a record of how the performance of the chip multithreading processor is later affected by changing one or more lookup tables. The performance of the chip multithreading processor may thus by affected either positively or negatively. That is, it is possible that increasing the size of a lookup table too much could result in the chip multithreading processor performing the operations slower, or less efficiently, than if the size of the lookup table had not been changed at all.

The cryptographic operations process 140-2 next increases the size of at least one of the lookup tables, such that at least one of the lookup tables is able to be stored in a processor cache located on a chip multithreading processor chip, step 503. The cryptographic operations process 140-2 then processes the selected cipher on the chip multithreading processor again, but this time after the cryptographic operations process 140-2 increased the size of one of the lookup tables, step 507. The cryptographic operations process 140-2 will then count the number of arithmetic logic unit operations executed during processing of the selected cipher on the chip multithreading processor with the increased lookup table to determine an adjusted operation count, step 508. Finally, the cryptographic operations process 140-2 compares the initial operation count with the adjusted operation count to determine an operation count result, step 509.

The operation count result reveals if the change in the size of the lookup table improved performance of the chip multithreading processor, or not. That is, if the initial operation count is greater than the adjusted operation count, the cryptographic operations process 140-2 improved performance of the chip multithreading processor during execution of the selected cipher, because the chip multithreading processor needed fewer operations to perform the cipher with the increased lookup table. If the opposite is true (i.e., the adjusted operation count is greater than the initial operation count, or alternatively, if the counts are equal), then the cryptographic operations process 140-2 did not improve performance of the chip multithreading processor, and may in fact have worsened performance.

Knowing the operation count result also allows further refinements to be made to the size of one or more lookup tables, if desired. For example, the cryptographic operations process 140-2 may adjust the size of the increased lookup table based on the operation count result, wherein the lookup table is able to be stored in a processor cache located on a chip multithreading processor chip after being adjusted, step 510. If the operation count result showed an improved performance by the chip multithreading processor, the cryptographic operations process 140-2 may then increase the size of the table again, process the cipher again, and count the number of operations again to see if a further increase results in further improvements in performance. This process may be repeated as many times as necessary. Alternatively, if the operation count result showed no change in performance, or a worsening of performance, then the cryptographic operations process 140-2 might decrease the size of the table, perform the cipher, count the operations, and see if the performance of the chip multithreading processor is thereby improved. This sequence may reveal that the initial increase in size of the lookup table was too much, and that a smaller increase in size may have resulted in improved performance. These refinements, either an increase in table size, or a decrease in table size, or some combination of both (if performed on more than one lookup table), can be applied as necessary to refine the performance of a chip multithreading processor.

A more accurate refinement may also include other information besides simply the number of operations needed to perform a cipher. The chip multithreading processor may, at any time, be executing a number of threads/performing other operations. Depending on the number of those operations, and the amount of processing resources they consume, the performance of the chip multithreading processor on just the operations of the cipher may be impacted either positively or negatively. That is, it is possible to imagine the same increase in the size of the same lookup table improving performance in one situation but worsening performance in another, when the other operations being performed by the chip multithreading processor are taken into account. Having this information could allow the cryptographic operations process 140-2 to further refine the size of one or more lookup tables, and thus further improve performance. To achieve this, the cryptographic operations process 140-2 may monitor other operations being executed on the chip multithreading processor to produce an operation execution result, step 511. The cryptographic operations process 140-2 may then use the operation execution result to further adjust the size of the increased lookup table, wherein the lookup table is able to be stored in a processor cache located on a chip multithreading processor chip after being adjusted, step 512. These further adjustments may be performed as described above, that is, may be increases or decreases (or both) in the size of one or more tables, repeated as many times as necessary to show a desired improvement in performance of the chip multithreading processor.

Figure 6A:
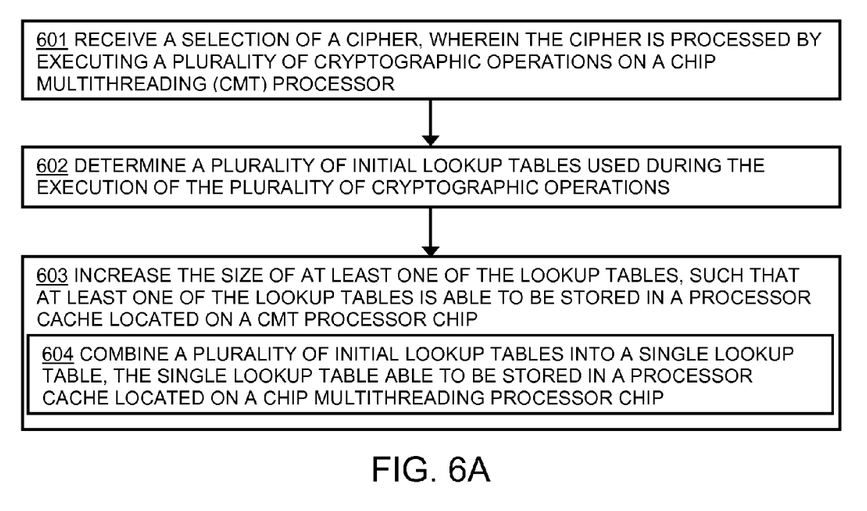
FIG. 6 illustrates flowcharts of procedures performed by the system of FIG. 1 when executing the cryptographic operations application as the cryptographic operations process to improve performance on a chip multithreading processor by adjusting the size of initial lookup tables.
Figure 6B:
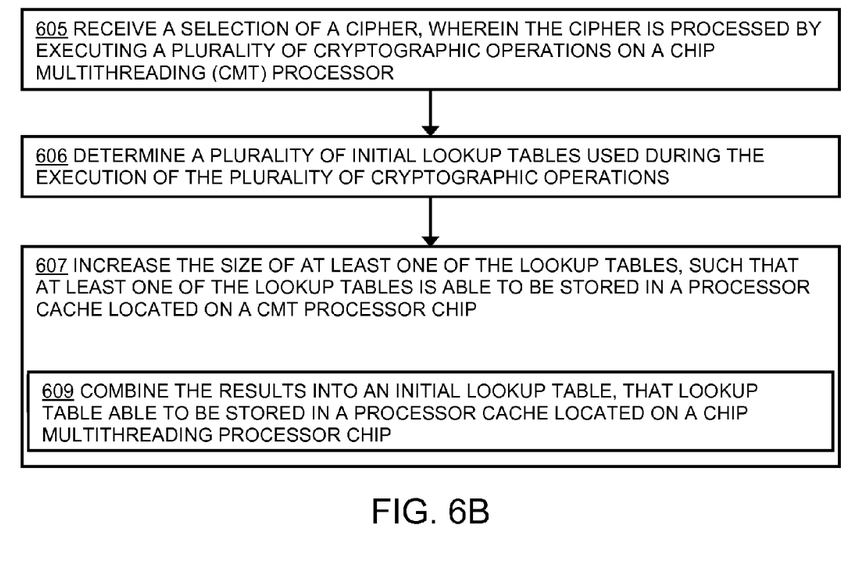

In FIGS. 6A and 6B, the size of lookup tables is increased in particular ways. FIG. 6A illustrates how a number of smaller lookup tables may be combined into a single larger lookup table. FIG. 6B illustrates how the results of pre-computed operations may be combined into a lookup table to make a larger lookup table. In FIG. 6A, the cryptographic operations process 140-2 first receives a selection of a cipher, step 601. The cipher is processed by executing a plurality of cryptographic operations on a chip multithreading processor. Having received the selection of a cipher, the cryptographic operations process 140-2 then determines a plurality of initial lookup tables used during the execution of the plurality of cryptographic operations, step 602. In some embodiments, the plurality of initial lookup tables may include a number of small lookup tables, that is, lookup tables that would, for example, easy fit in the level-1 cache on a processor chip. The cryptographic operations process 140-2 then increases the size of at least one of the lookup tables, step 603, by combining a plurality of initial lookup tables into a single lookup table, step 604, the single lookup table able to be stored in a processor cache located on a chip multithreading processor chip. The number of initial lookup tables that are combined may be a subset of the plurality of initial lookup tables, so long as the resulting combined table is able to be stored on the level-2 cache.

In FIG. 6B, the cryptographic operations process 140-2 first receives a selection of a cipher, step 605. The cipher is processed by executing a plurality of cryptographic operations on a chip multithreading processor. Having received the selection of a cipher, the cryptographic operations process 140-2 then determines a plurality of initial lookup tables used during the execution of the plurality of cryptographic operations, step 606. The cryptographic operations process 140-2 then increases the size of at least one of the lookup tables, step 607, by pre-computing additional operations to produce results, step 608, and combining the results into an initial lookup table, that lookup table able to be stored in a processor cache located on a chip multithreading processor chip, step 609.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method of processing a cipher using a chip multithreading (CMT) processor, the method comprising:
   receiving a selection of a cipher, wherein the cipher is processed by executing a plurality of arithmetic logic unit operations on a chip multithreading processor;
   determining lookup tables used during the execution of the plurality of arithmetic logic unit operations;
   counting a number of arithmetic logic unit operations executed during processing of the selected cipher on the chip multithreading processor to determine an initial operation count;
   increasing the size of at least one lookup table to thereby reduce a number of the lookup tables in order to improve processing the cipher by the chip multithreading processor, wherein the at least one lookup table is able to be stored in a processor cache located on a chip multithreading processor chip;
   processing the selected cipher on the chip multithreading processor after increasing the size of the at least one lookup table;
   counting the number of arithmetic logic unit operations executed during processing of the selected cipher on the chip multithreading processor with the increased at least one lookup table to determine an adjusted operation count;
   comparing the initial operation count with the adjusted operation count to determine an operation count result; and
   adjusting the size of the increased at least one lookup table based on the operation count result, wherein the increased at least one lookup table is able to be stored in a processor cache located on a chip multithreading processor chip after being adjusted.

2. The method of claim 1 wherein increasing comprises:
   increasing the size of the at least one lookup table such that no lookup table is so large that it is unable to be stored in a processor cache located on a chip multithreading processor chip.

3. The method of claim 2 wherein receiving comprises:
   receiving a selection of a Kasumi cipher, wherein the Kasumi cipher is performed by executing a plurality of arithmetic logic unit operations; and
   wherein increasing comprises:
   increasing the size of two lookup tables such that each of the two tables is able to be stored in a processor cache located on a chip multithreading processor chip.

4. The method of claim 1 comprising:
   monitoring other operations being executed on the chip multithreading processor to produce an operation execution result; and
   using the operation execution result to further adjust the size of the increased at least one lookup table, wherein the increased at least one lookup table is able to be stored in a processor cache located on a chip multithreading processor chip after being adjusted.

5. The method of claim 1 wherein determining comprises:
   determining a plurality of initial lookup tables used during the execution of the plurality of arithmetic logic unit operations; and
   wherein increasing comprises combining a plurality of initial lookup tables into a single lookup table, the single lookup table able to be stored in a processor cache located on a chip multithreading processor chip.

6. The method of claim 1 wherein determining comprises:
   determining a plurality of initial lookup tables used during the execution of the plurality of arithmetic logic unit operations; and
   wherein increasing comprises:
   pre-computing additional operations to produce results; and
   combining results into an initial lookup table, that lookup table able to be stored in a processor cache located on a chip multithreading processor chip.

7. A computer program product, stored on a non-transitory computer readable storage medium, to process a cipher using a chip multithreading (CMT) processor, the computer program product comprising:
   computer program code for receiving a selection of a cipher, wherein the cipher is processed by executing a plurality of arithmetic logic unit operations on a chip multithreading processor;
   computer program code for determining lookup tables used during the execution of the plurality of arithmetic logic unit operations;
   computer program code for counting a number of arithmetic logic unit operations executed during processing of the selected cipher on the chip multithreading processor to determine an initial operation count;
   computer program code for increasing the size of at least one lookup table to thereby reduce a number of the lookup tables in order to improve processing the cipher by the chip multithreading processor, wherein the at least one lookup table is able to be stored in a processor cache located on a chip multithreading processor chip;
   computer program code for processing the selected cipher on the chip multithreading processor after increasing the size of the at least one lookup table;
   computer program code for counting the number of arithmetic logic unit operations executed during processing of the selected cipher on the chip multithreading processor with the increased at least one lookup table to determine an adjusted operation count;

computer program code for comparing the initial operation count with the adjusted operation count to determine an operation count result; and computer program code for adjusting the size of the increased at least one lookup table based on the operation count result, wherein the increased at least one lookup table is able to be stored in a processor cache located on a chip multithreading processor chip after being adjusted.

8. The computer program product of claim 7 wherein computer program code for increasing comprises:

computer program code for increasing the size of the at least one lookup table such that no lookup table is so large that it is unable to be stored in a processor cache located on a chip multithreading processor chip.

9. The computer program product of claim 7 comprising:

computer program code for monitoring other operations being executed on the chip multithreading processor to produce an operation execution result; and computer program code for using the operation execution result to further adjust the size of the increased at least one lookup table, wherein the increased at least one lookup table is able to be stored in a processor cache located on a chip multithreading processor chip after being adjusted.

10. A computer system comprising:

a non-transitory computer readable memory;

a processor chip including a chip multithreading processor and a processor cache;

a communications interface;

an interconnect mechanism coupling the memory, the processor chip, and the communications interface, allowing communications there between;

wherein the memory is encoded with a cryptographic operations application, that when executed in the chip multithreading processor of the processor chip, processes a cipher by causing the computer system to perform the operations of:

receiving a selection of a cipher, wherein the cipher is processed by executing a plurality of arithmetic logic unit operations on a chip multithreading processor;

determining lookup tables used during the execution of the plurality of arithmetic logic unit operations;

counting a number of arithmetic logic unit operations executed during processing of the selected cipher on the chip multithreading processor to determine an initial operation count;

increasing the size of at least one lookup table to thereby reduce a number of the lookup tables in order to improve processing the cipher by the chip multithreading processor, wherein the at least one lookup table is able to be stored in a processor cache located on a chip multithreading processor chip;

processing the selected cipher on the chip multithreading processor after increasing the size of the at least one lookup table;

counting the number of arithmetic logic unit operations executed during processing of the selected cipher on the chip multithreading processor with the increased at least one lookup table to determine an adjusted operation count;

comparing the initial operation count with the adjusted operation count to determine an operation count result; and adjusting the size of the increased at least one lookup table based on the operation count result, wherein the increased at least one lookup table is able to be stored in a processor cache located on a chip multithreading processor chip after being adjusted.

11. The computer system of claim 10 wherein increasing comprises:

increasing the size of the at least one lookup table such that no lookup table is so large that it is unable to be stored in a processor cache located on a chip multithreading processor chip.

12. The computer system of claim 10 wherein the computer system performs operations of:

monitoring other operations being executed on the chip multithreading processor to produce an operation execution result; and using the operation execution result to further adjust the size of the increased at least one lookup table, wherein the increased at least one lookup table is able to be stored in a processor cache located on a chip multithreading processor chip after being adjusted.

\* \* \* \* \*